(12) United States Patent
Lin et al.

(10) Patent No.: US 12,531,117 B2
(45) Date of Patent: Jan. 20, 2026

(54) SEMICONDUCTOR DEVICE AND PROGRAMMABLE MACRO CIRCUIT

(71) Applicant: TAIWAN SEMICONDUCTOR MANUFACTURING COMPANY LTD., Hsinchu (TW)

(72) Inventors: Yu-Wei Lin, Taichung (TW); Meng-Sheng Chang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 142 days.

(21) Appl. No.: 18/505,064

(22) Filed: Nov. 8, 2023

(65) Prior Publication Data

US 2025/0149086 A1 May 8, 2025

(51) Int. Cl.
*G11C 13/00* (2006.01)
*G11C 17/16* (2006.01)

(52) U.S. Cl.
CPC ...... *G11C 13/0069* (2013.01); *G11C 13/0026* (2013.01); *G11C 13/0028* (2013.01); *G11C 17/165* (2013.01)

(58) Field of Classification Search
CPC ............ G11C 13/0004; G11C 13/0007; G11C 13/0026; G11C 13/0028; G11C 13/0038; G11C 13/025; G11C 17/165; G11C 2013/0073; G11C 2213/35; G11C 2213/71; G11C 2213/72; G11C 7/12; G11C 13/00; G11C 2029/1204; G11C 29/02; G11C 29/24; G11C 29/44; G11C 29/76; G11C 29/78; G11C 29/808; G11C 11/406; G11C 11/408; G11C 17/16; G11C 2029/1202; G11C 2029/3602; G11C 29/022; G11C 29/04; G11C 29/12; G11C 29/36; G11C 29/42; G11C 29/4401; G11C 29/52; G11C 29/56008; G11C 29/783; G11C 29/804; G11C 29/846; G11C 29/848; G11C 5/02; G11C 5/063; G11C 8/08; G11C 8/14
See application file for complete search history.

(56) References Cited

U.S. PATENT DOCUMENTS 7,257,039 B2 * 8/2007 Bedeschi ............... G11C 29/83
365/230.06

* cited by examiner

*Primary Examiner* — Thong Q Le
(74) *Attorney, Agent, or Firm* — WPAT LAW; Anthony King

(57) ABSTRACT

The present disclosure provides a semiconductor device and an electrostatic discharge (ESD) clamp circuit. The semiconductor device includes a voltage divider, a cascoded inverter, and a discharge circuit. The voltage divider is electrically coupled between a power supply voltage and an output voltage of the semiconductor device. The cascoded inverter is electrically coupled to the voltage divider. The discharge circuit is electrically coupled to the cascoded inverter. The cascoded inverter is configured to turn on the discharge circuit o discharge an electrostatic discharge (ESD) current in response to an ESD event occurring on the power supply voltage or the output voltage when the semiconductor device is in an ESD mode.

20 Claims, 15 Drawing Sheets

SEMICONDUCTOR DEVICE AND PROGRAMMABLE MACRO CIRCUIT

BACKGROUND

The present disclosure relates to integrated circuit (IC) semiconductor devices, and, in particular, to a semiconductor device and a programmable macro circuit.

A non-volatile memory (NVM) is usually equipped in an integrated circuit. The non-volatile memory is capable of retaining data after the IC is turned off. Configurations of an integrated circuit can be reprogrammed using some non-volatile memories which utilize technologies of electrical fuses (eFuse).

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features can be arbitrarily increased or reduced for clarity of discussion.

DETAILED DESCRIPTION

Figure 1A:
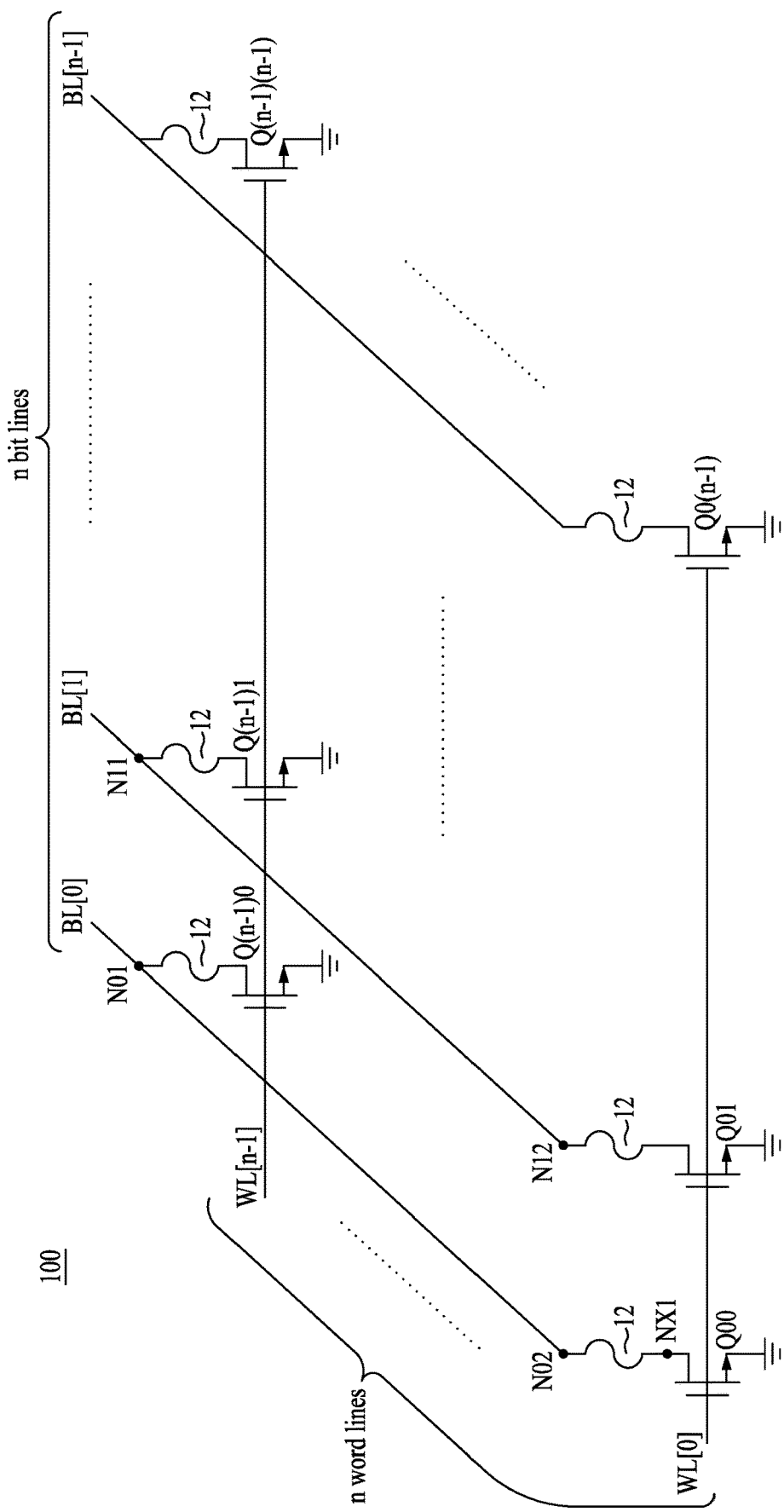
FIG. 1A is a schematic diagram of a semiconductor device in accordance with an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features can be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, it will be understood that when an element is referred to as being "connected to" or "coupled to" another element, it can be directly connected to or coupled to the other element, or intervening elements can be present.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device can be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

Figure 1B:
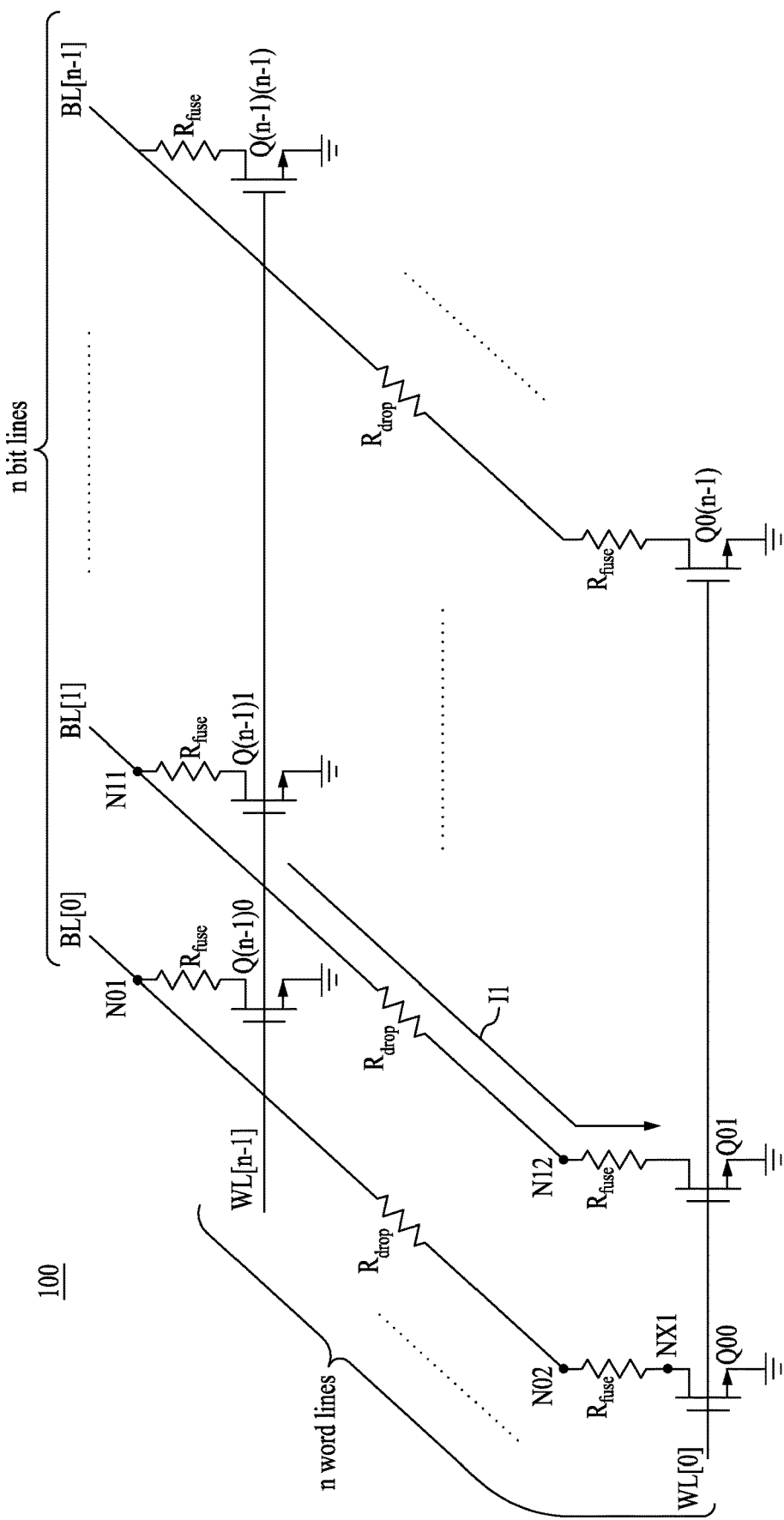
FIG. 1B a diagram illustrating the equivalent resistances in the semiconductor device in FIG. 1A.

FIG. 1A is a schematic diagram of a semiconductor device in accordance with an embodiment of the present disclosure. FIG. 1B a diagram illustrating the equivalent resistances in the semiconductor device in FIG. 1A.

As depicted in FIG. 1A, the semiconductor device 100 may be a programmable macro circuit, which may be widely used in a variety of applications such as chip identifiers, memory redundancy, security code, configuration settings, feature selection, etc. The semiconductor device 100 may include a plurality of programmable elements 12 arranged in a two-dimensional array including n word lines WL[0] to WL[n−1] and n bit lines BL[0] to BL[n−1], wherein n is a positive integer. In some embodiments, n may be 64, 128, or 256, but the present disclosure is not limited thereto.

In some embodiments, the programmable elements 12 may be implemented using fuse elements such as electrical fuses (eFuses), metal fuses, poly fuses, anti-fuses, etc., but the present disclosure is not limited thereto. In some other embodiments, the programmable elements 12 may be implemented using one-time-programmable non-volatile memory (NVM) cells, such as resistive random access memory (RRAM) cells, magnetoresistive random access memory (MRAM) cells, phase-change random access memory (PCRAM) cells, ultraviolet-erasable programmable read-only memory (UV-EPROM), etc., but the present is not limited thereto. In some other embodiments, the programmable elements may be implemented using few-time-programmable or multiple-time-programmable NVM cells.

In some embodiments, each of the programmable elements 12 has a respective programming device, such as programming devices Q00 to Q(n−1)(n−1) that are shown as N-type transistors for purposes of description. The programming devices can also be implemented using P-type transistors, or other types of transistors. In some embodiments, one of the first terminal and second terminal of the programming device (e.g, Q00 to Q(n−1)(n−1)) is a source terminal, and the other of the first terminal and the second terminal is a drain terminal. In some embodiments, the third terminal of the programming device may be a gate terminal electrically connected the respective word line.

More specifically, each of the word lines may be configured to turn on the programming devices thereon. For example, the word line WL[0] may be configured to control the programming devices Q00 to Q0(n−1), and the word line WL[n−1] may be configured to control the programming devices Q(n−1)0 to Q(n−1)(n−1), and so on. In addition, the positions of the programmable elements 12 can be referred to the word-line number (e.g., WL[0] to WL[n−1]) and the bit line number (e.g., BL[0] to BL[n−1]) by which the programmable elements 12 are controlled. For example, the programmable element 12 at position (0,0) may be controlled by the word line WL[0] and the bit line BL[0], and the programmable element at position (1, 2) may be controlled by the word line WL[1] and the bit line BL[2], and so on.

In some embodiments, when a specific programmable element 12 is to be programmed, the word line on which the specific programmable element 12 is asserted to activate the transistor corresponding to the specific programmable element. In addition, a high voltage pulse (e.g., a power supply voltage VCCMIN generated by an external driving circuit) may be applied to the bit line on which the specific programmable element 12 is located, and a current may flow through the bit line, the specific programmable element 12 and its respective transistor so as to program the specific programmable element 12. After a certain programming duration, the programmable element 12 may be blown or programmed to alter the logic state of the programmable element 12.

For example, given that the programmable element at position (0,0) is to be programmed, the word line WL[0] is asserted (i.e., the voltage thereof is raised to the power supply voltage VCCMIN), and a high voltage pulse may be applied to node N01 on the bit line BL[0], and a current will flow through the bit line BL[0] (e.g., from node N01 to node N02), the programmable element 12, and the programming device Q00. After a certain programming duration, the programmable element 12 at position (0, 0) may be blown or programmed to alter the logic state thereof.

In some embodiments, assuming that the programmable element 12 is implemented by an eFuse, when the programmable element 12 is not programmed (i.e., closed) yet, the resistance of the programmable element 12 may be relatively small. In some embodiments the closed resistance value of the programmable element 12 may be between 5 ohms to 200 ohms, but the present disclosure is not limited thereto. After the programmable element 12 is programmed (i.e., open), the resistance value of the programmable element 12 may be relatively large. In some embodiments, the open resistance of the programmable element 12 may be about 1K ohms to 100 M ohms, but the present disclosure is not limited thereto.

In some embodiments, the programmable element 12 may also be implemented by an anti-fuse. When the programmable element 12 is not programmed (i.e., closed) yet, the resistance of the programmable element 12 may be relatively large. After the programmable element 12 is programmed (i.e., open), the resistance value of the programmable element 12 may be relatively small.

FIG. 1B illustrates equivalent resistances in the semiconductor device 100 shown in FIG. 1A. For example, the programmable elements 12 may be illustrated as their equivalent resistance $R_{fuse}$, and the bit lines BL[0] to BL[n−1] may be illustrated as their equivalent resistance $R_{drop}$, which may be parasitic resistances. In addition, the programming devices (e.g., transistors Q00 to Q(n−1)(n−1)) may have their respective resistance values while activated.

In some embodiments, the semiconductor device 100 may be an ultra-high-density eFuse macro, and the number of word lines and bit lines may be 256 or higher, resulting in longer lengths of bit lines and current paths. In some embodiments, the lengths of bit lines of the semiconductor device 100 may be longer than 200 μm, and the voltage drop across the equivalent resistance $R_{drop}$ of the asserted bit line can be considerable while performing the programming operation of the programmable element 12. Specifically, the power supply voltage VCCMIN for programming the programmable elements 12 may vary within a tolerance range (e.g., +20% to −20%). If the macro size of the semiconductor device 100 is relatively small (e.g., n=32 or fewer), the power supply voltage VCCMIN at the minus tolerance range (e.g., −20%) may be still sufficient to program the programmable element 12.

However, if the macro size of the semiconductor 100 is relatively large (e.g., n=256 or above), the power supply voltage VCCMIN below a certain voltage tolerance level (e.g., −10%) may be not sufficient to program the programmable element 12 due the larger voltage drop caused by the equivalent resistance of a longer current path. At this time, the equivalent resistance of the bit line may mainly contribute to the overall equivalent resistance of the current path (e.g., from the power supply voltage VCCMIN to the ground through the programmed programmable element 12) which cannot be significantly reduced by resizing the programming devices (e.g., transistors Q00 to Q(n−1)(n−1)).

Figure 2A:
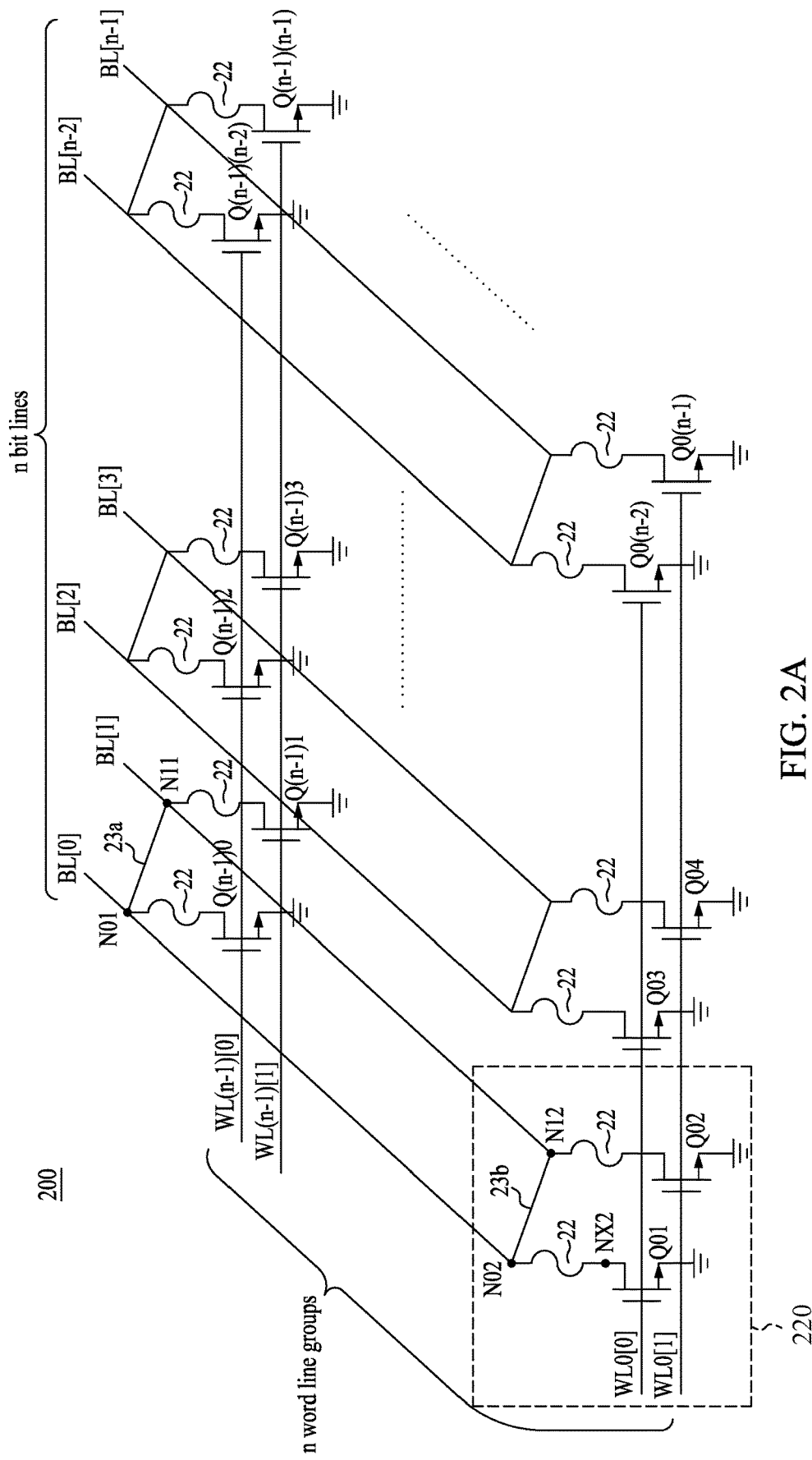
FIG. 2A is a schematic diagram of a semiconductor device in accordance with another embodiment of the present disclosure.
Figure 2B:
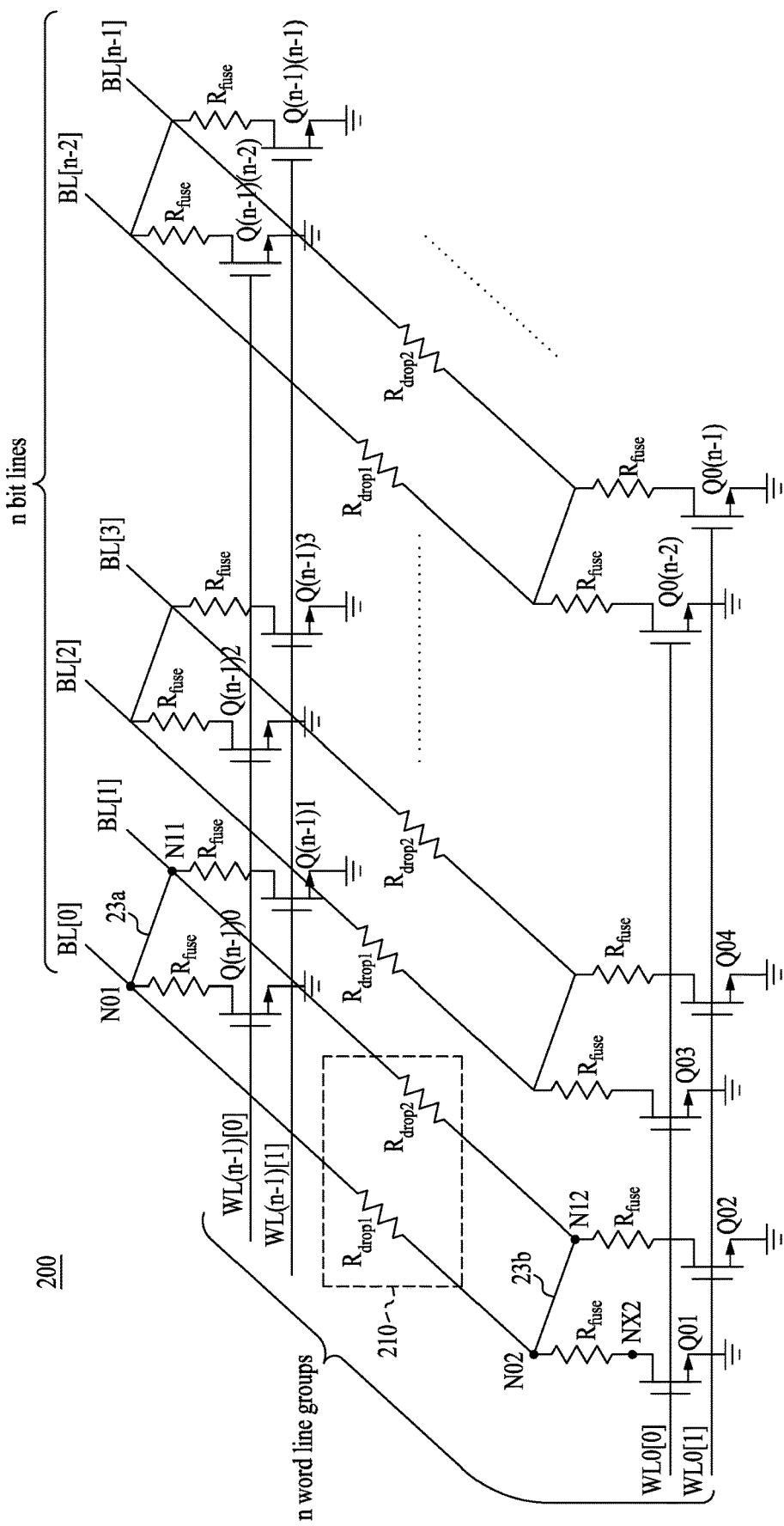
FIG. 2B a diagram illustrating the equivalent resistances in the semiconductor device in FIG. 2A.
Figure 2C:
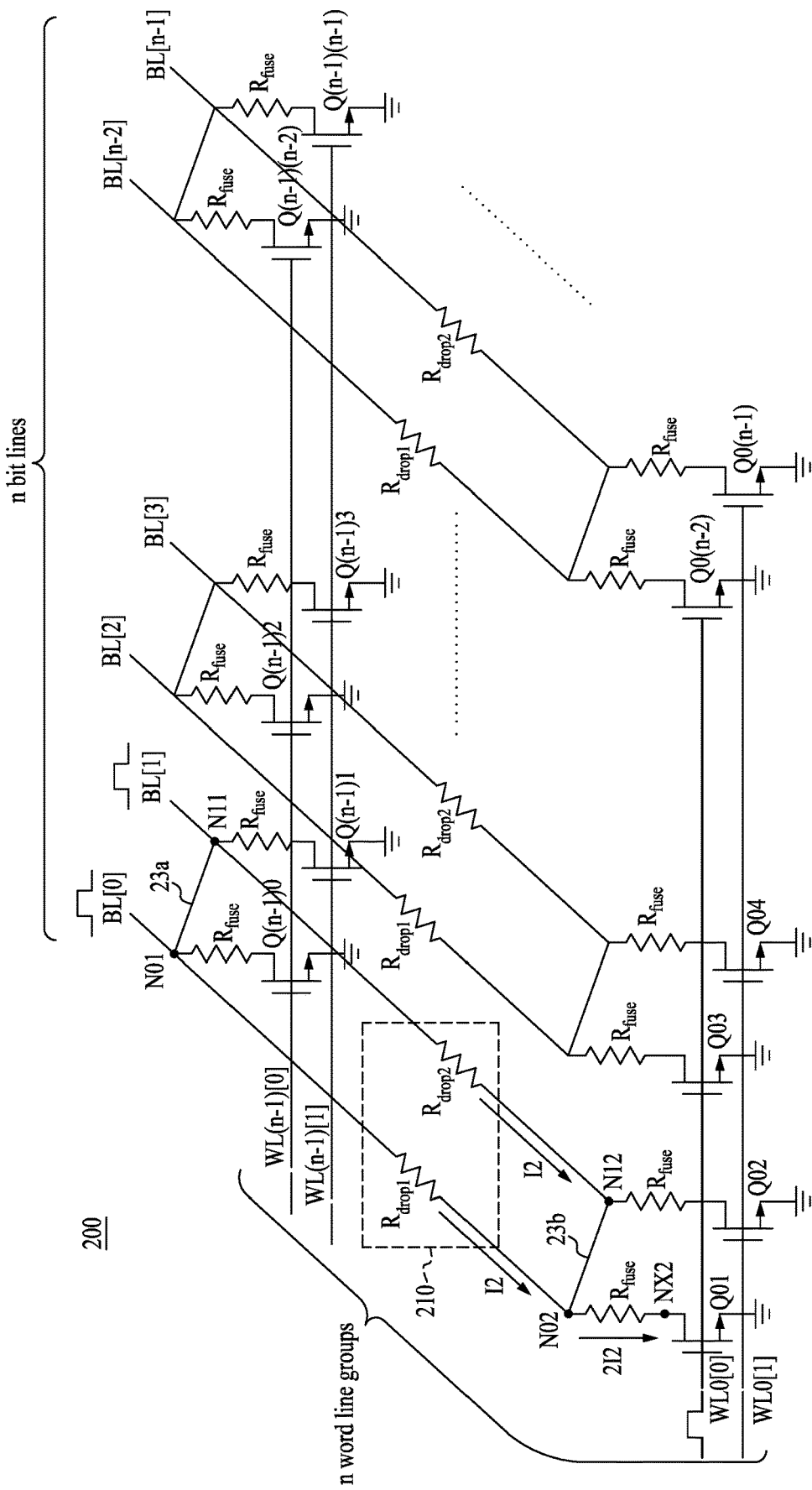
FIG. 2C a diagram illustrating the current path in FIG. 2B.

FIG. 2A is a schematic diagram of a semiconductor device in accordance with another embodiment of the present disclosure. FIG. 2B a diagram illustrating the equivalent resistances in the semiconductor device in FIG. 2A. FIG. 2C a diagram illustrating the current path in FIG. 2B.

As depicted in FIG. 2A, the semiconductor device 200 may be a programmable macro circuit, which may be widely used in a variety of applications such as chip identifiers, memory redundancy, security code, configuration settings, feature selection, etc. The semiconductor device 200 may include a plurality of programmable elements 22 arranged in a two-dimensional array including n word line groups WL0 to WL(n−1) and n bit lines BL[0] to BL[n−1], wherein n is a positive integer. In some embodiments, n may be a positive even number such as 64, 128, or 256, but the present disclosure is not limited thereto.

In some embodiments, the programmable elements 22 may be implemented using fuse elements such as electrical fuses (eFuses), poly fuses, anti-fuses, etc., but the present disclosure is not limited thereto. In some other embodiments, the programmable elements 22 may be implemented using one-time-programmable non-volatile memory (NVM) cells, such as resistive random access memory (RRAM) cells, magnetoresistive random access memory (MRAM) cells, phase-change random access memory (PCRAM) cells, ultraviolet-erasable programmable read-only memory (UV-EPROM), etc., but the present is not limited thereto. In some other embodiments, the programmable elements may be implemented using few-time-programmable or multiple-time-programmable NVM cells.

In some embodiments, each of the word line groups WL0 to WL(n−1) may include two word lines. For example, the word line group WL0 may include word lines WL0[0] and WL0[1], wherein the word line WL0[0] may be configured to control the programmable elements 22 and respective programming devices associated with even-numbered bit lines (e.g., BL[0], BL[2], . . . , BL[n−2]), and the word line WL0[1] may be configured to control the programmable elements 22 and respective programming devices associated with odd-numbered bit lines (e.g., BL[1], BL[3], . . . , BL[n−1]), as depicted in FIG. 2A. In addition, the positions of the programmable elements 22 can be referred to the word-line-group number (e.g., WL0 to WL(n−1)) and the bit line number (e.g., BL[0] to BL[n−1]) by which the programmable elements 22 are controlled. For example, the programmable element 22 at position (0,0) may be controlled by the word line WL0[0] and the bit line BL[0], and the programmable element at position (1, 1) may be controlled by the word line WL1 [1] and the bit line BL[1], and so on.

In some embodiments, the bit lines BL[0] to BL[n−1] can be divided into n/2 bit line groups, and each bit line group may include two adjacent bit lines. For example, the bit lines BL[0] and BL[1] may form a bit line group, and the bit lines BL[2] and BL[3] may form another bit line group, and so on. The two bit lines in each of the bit line group may be shunted. Taking the first bit line group as an example, nodes N01 and N02 on the bit line BL[0] may be electrically connected to nodes N11 and N12 on the bit line BL[1] through conductive wires 23a and 23b, so the bit lines BL[0] and BL[1] are shunted, as depicted in FIG. 2A.

FIG. 2B illustrates equivalent resistances in the semiconductor device 200. For example, the equivalent resistance of the programmable elements 22 can be represented by the resistances $R_{fuse}$. The equivalent resistances of the bit lines BL[0] and BL[1] (e.g., the first bit line and the second bit line in each bit line group) can be represented by the resistances $R_{drop1}$ and $R_{drop2}$, respectively. Since the bit lines BL[0] and BL[1] are shunted, the equivalent resistance $R_{drop}$ of the bit line group including the bit lines BL[0] and BL[1] in region 210 can be expressed using formula (1) as follows.

$$R_{drop} \approx R_{drop1}//R_{drop2} \quad (1)$$

Assuming that the resistances $R_{drop1}$ and $R_{drop2}$ are substantially equal, the equivalent resistance $R_{drop}$ of the bit line group can be significantly reduced. It should be noted that the semiconductor device 200 shown in FIG. 2A may use a 1-to-2 bit-line sharing scheme, but the present disclosure is not limited thereto. For example, 1-to-3, 1-to-4, . . . , or 1-to-N bit-line sharing scheme can be used in each bit cell of the semiconductor device 200 depending on practical needs, the details of which will be described in the embodiments of FIGS. 6A-6C.

FIG. 2C illustrates the paths of programming currents in FIG. 2B. In some embodiments, when the programmable element 22 at position (0, 0) is to be programmed, the word line WL0[0] may be asserted to activate the programming devices (e.g., Q01, Q03, . . . , Q0(n−2)) on the word line WL0[0]. When a voltage pulse may be applied to both the bit lines BL[0] and BL[1] in the same bit line group, and a current I2 may flow through the bit line BL[0] (e.g., from node N01 to node N02), and another current I2 may flow through the bit line BL[1] (e.g., from node N11 to node N12). Since the programming device Q02 is not activated at this time, the current I2 flowing through the bit line BL[1] will join the current I2 flowing through the bit line BL[0] at node N02. Thus, a total current of 2*I2 will flow through the programmable element 22 (e.g., coupled between nodes N02 and NX2, and represented as $R_{fuse}$ in FIG. 2C) and the programming device Q01. In other words, the programming current of the programmable element 22 in the semiconductor device 200 can be improved in comparison with that of the programmable element 11 in the semiconductor device 100 in FIG. 1A.

It should be noted that one word line and one bit line are activated at one time during the programming procedure of the semiconductor device 200. The overall resistance $R_{drop}$ of the bit line group can be significantly reduced by shunting the unselected bit line and organizing the word line groups. Assuming that the fuse area (e.g., total area of programmable elements 22 and the programming devices) and the macro area (e.g., total area of all components in the semiconductor device 200) in the semiconductor device 200 remain unchanged, the parasitic resistance of the programming path of the programmable elements 22 can be reduced, and the programming current of the programmable elements 22 can be improved. In some embodiments, the programming current of the programmable elements 22 shown in FIG. 2A can be improved by 7% in comparison with that of the programmable elements 12 shown in FIG. 1A.

In some embodiments, the overall resistance of the programming path of the programmable elements 22 can be reduced by resizing the programming devices (e.g., reducing the width of the transistors Q01 to Q(n−1)(n−1)), thereby achieving a fixed programming current. In addition, the fuse area and macro area in the semiconductor device 200 can be reduced as well.

Figure 3:
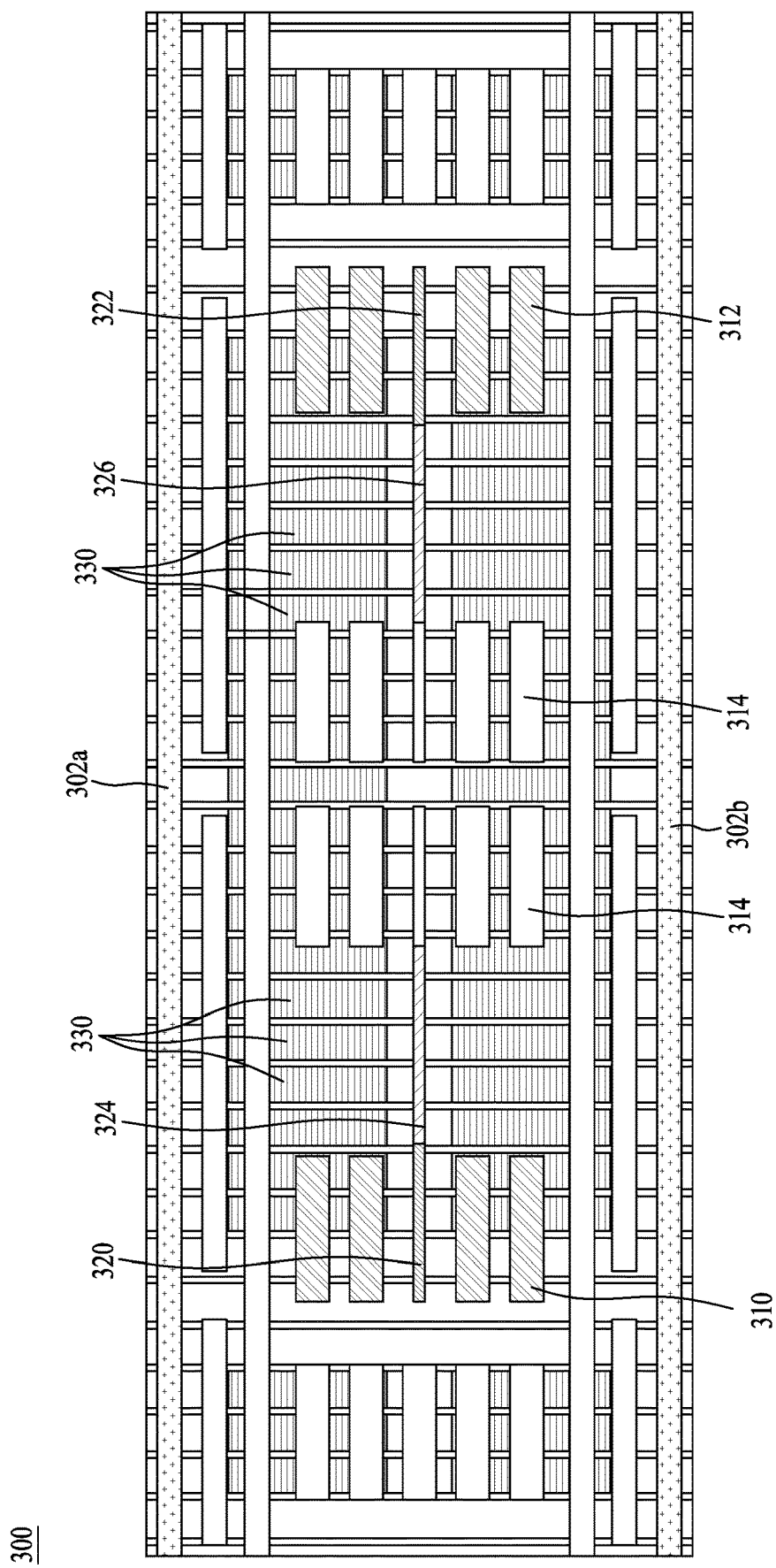
FIG. 3 is a top view of a layout diagram of a bit cell in a semiconductor device in accordance with an embodiment of the present disclosure.

FIG. 3 is a top view of a layout diagram of a bit cell in a semiconductor device in accordance with an embodiment of the present disclosure. Please refer to FIG. 1A and FIG. 3.

In some embodiments, the bit cell 300 may be used in the semiconductor device 100 shown in FIG. 1A. The bit cell 300 may include a plurality of transistors 330, bit lines 310 and 312, a word line (e.g., 302a plus 302b), programmable elements 324 and 326, as depicted in FIG. 3. The conductive elements 302a and 302b may refer to the same word line since they may be electrically connected to each other in the subsequent layers. The reference numerals 320 and 322 may refer to the first power supply voltage (e.g., VDDQI[0]) and the second power supply voltage (e.g., VDDQI[1]) for the bit lines 310 and 312, respectively. In addition, the control circuit 314 for the bit lines BL[0] and BL[1] may be disposed in the center region of the layout diagram shown in FIG. 3.

When the programmable element 324 is to be programmed, the conductive elements 302a and 302b (i.e., the same word line) may be asserted to activate the programming devices (e.g., a portion of the transistors 330) thereon. Then, a voltage pulse can be applied to the first power supply voltage (e.g., VDDQI[0]) to program the programmable element 324 through the bit line 310, and the programmable element 324 will alter its logical state after a certain programming time. Similarly, when the programmable element 326 is to be programmed, the conductive elements 302a and 302b may be asserted to activate the programming devices (e.g., a portion of the transistors 330) thereon. Then, a voltage pulse can be applied to the second power supply voltage (e.g., VDDQI[1]) to program the programmable element 326 through the bit line 312, and the programmable element 326 will alter its logical state after a certain programming time.

Figure 4:
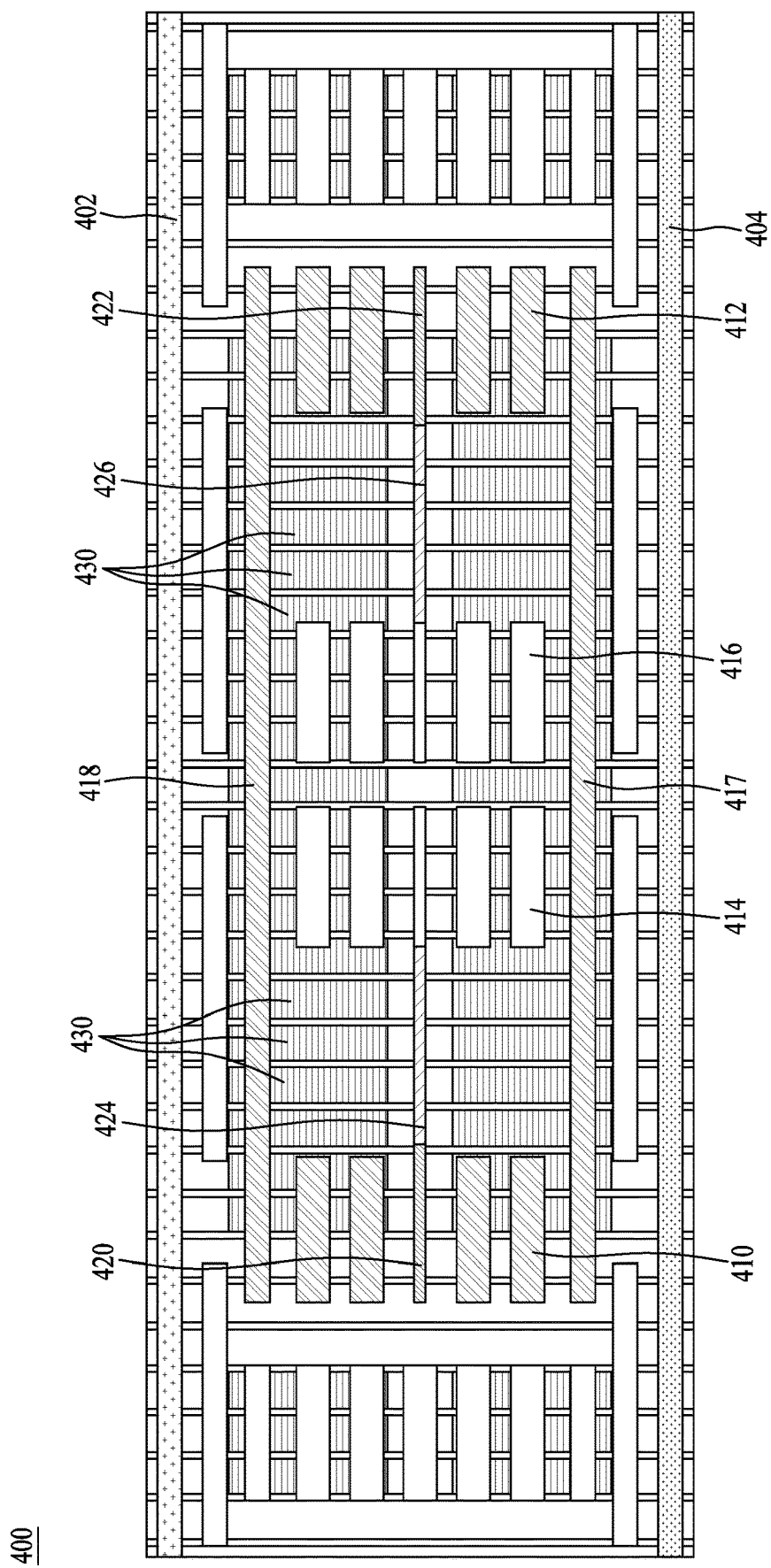
FIG. 4 is a top view of a layout diagram of a bit cell in a semiconductor device in accordance with another embodiment of the present disclosure.

FIG. 4 is a top view of a layout diagram of a bit cell in a semiconductor device in accordance with another embodiment of the present disclosure. Please refer to FIG. 2A and FIG. 4.

In some embodiments, the bit cell 400 may be used in the semiconductor device 200 shown in FIG. 2A. The bit cell 400 may include a plurality of transistors 430, bit lines 410 and 412, word lines 402 and 404, programmable elements 424 and 426, as depicted in FIG. 4. In comparison with the conductive elements 302a and 302b shown in FIG. 3, the word lines 402 and 404 shown in FIG. 4 may refer to different word lines since they may be not electrically connected to each other in the subsequent layers. The reference numerals 420 and 422 may refer to the first power supply voltage (e.g., VDDQI[0]) and the second power supply voltage (e.g., VDDQI[1]) for the bit lines 410 and 412, respectively. In addition, the control circuits 414 and 416 for the bit lines BL[0] and BL[1] may be disposed in the center region of the layout diagram shown in FIG. 4, respectively. The bit lines 410 and 412 (e.g., BL[0] and BL[1]) may be shunted by the conductive lines 417 and 418.

When the programmable element 424 is to be programmed, the word line 402 may be asserted to activate the programming devices (e.g., a portion of the transistors 430) thereon. Then, a voltage pulse can be applied to the first power supply voltage (e.g., VDDQI[0]) to program the programmable element 424 through the bit line 410, and the programmable element 424 will alter its logical state after a certain programming time. Similarly, when the programmable element 426 is to be programmed, the word line 404 may be asserted to activate the programming devices (e.g., a portion of the transistors 430) thereon. Then, a voltage pulse can be applied to the second power supply voltage (e.g., VDDQI[1]) to program the programmable element 426 through the bit line 412, and the programmable element 426 will alter its logical state after a certain programming time.

Figure 5:
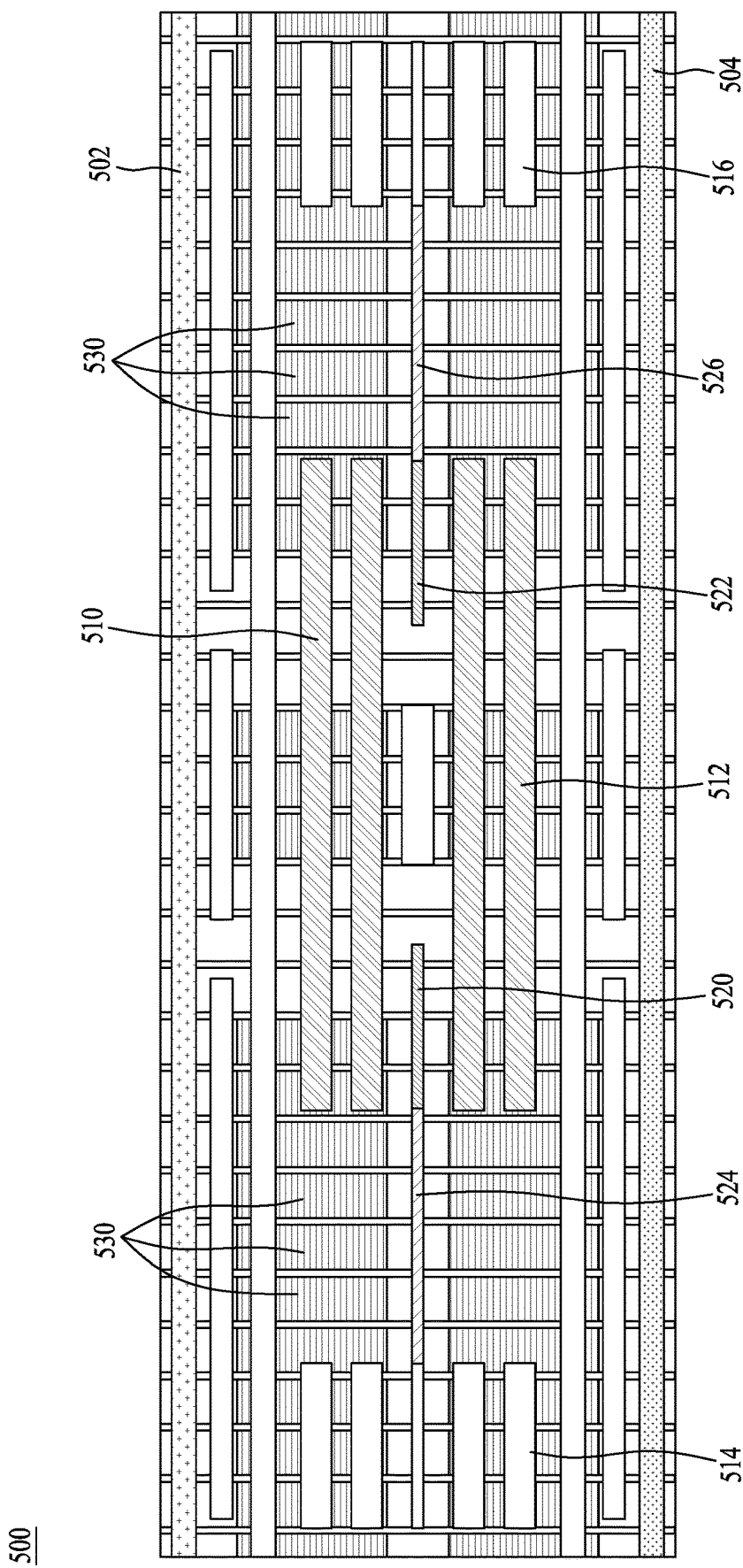
FIG. 5 is a top view of a layout diagram of a bit cell in a semiconductor device in accordance with yet another embodiment of the present disclosure.

FIG. 5 is a top view of a layout diagram of a bit cell in a semiconductor device in accordance with yet another embodiment of the present disclosure. Please refer to FIG. 2A and FIG. 5.

In some embodiments, the bit cell 500 may be used in the semiconductor device 200 shown in FIG. 2A. The bit cell 500 may include a plurality of transistors 530, bit lines 510 and 512, word lines 502 and 504, programmable elements 524 and 526, as depicted in FIG. 5. Similar to FIG. 4, the word lines 502 and 504 shown in FIG. 5 may refer to different word lines since they may be not electrically connected to each other in the subsequent layers. The reference numerals 520 and 522 may refer to the first power supply voltage (e.g., VDDQI[0]) and the second power supply voltage (e.g., VDDQI[1]) for the bit lines 510 and 512, respectively. In addition, the control circuits 514 and 516 for the bit lines BL[0] and BL[1] may be disposed in the left region and the right region of the layout diagram shown in FIG. 5, respectively. Since the bit lines 510 and 512 may be arranged across the central region of the layout diagram in FIG. 5, the bit lines 510 and 512 are shunted.

When the programmable element 524 is to be programmed, the word line 502 may be asserted to activate the programming devices (e.g., a portion of the transistors 530) thereon. Then, a voltage pulse can be applied to the first power supply voltage (e.g., VDDQI[0]) to program the programmable element 524 through the bit line 510, and the programmable element 524 will alter its logical state after a certain programming time. Similarly, when the programmable element 526 is to be programmed, the word line 504 may be asserted to activate the programming devices (e.g., a portion of the transistors 530) thereon. Then, a voltage pulse can be applied to the second power supply voltage (e.g., VDDQI[1]) to program the programmable element 526 through the bit line 512, and the programmable element 526 will alter its logical state after a certain programming time.

Figure 6A:
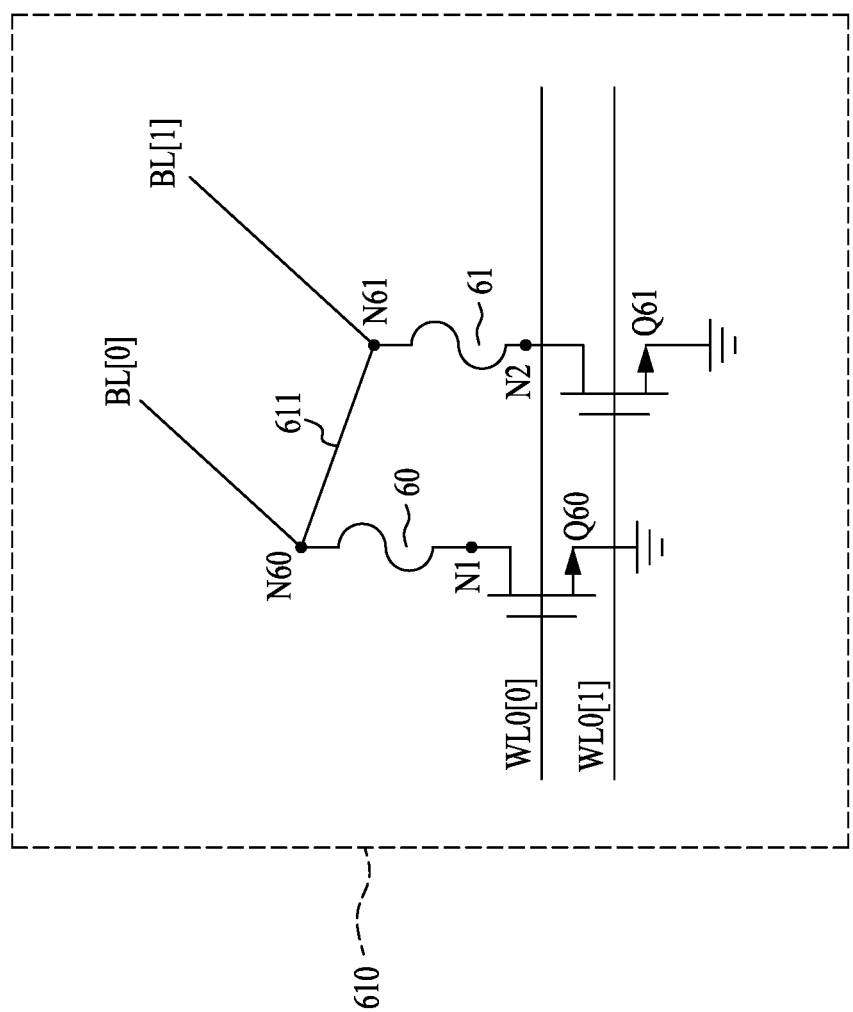
FIG. 6A is a schematic diagram of a bit cell using a 1-to-2 bit-line sharing scheme in accordance with an embodiment of the present disclosure.

FIG. 6A is a schematic diagram of a bit cell using a 1-to-2 bit-line sharing scheme in accordance with an embodiment of the present disclosure.

In some embodiments, region 220 in FIG. 2A may represent a bit cell of the semiconductor device 200, and the bit cell may be implemented by the bit cell 610 shown in FIG. 6A. In other words, the semiconductor device 200 may include a plurality of bit cells 610 which use a 1-to-2 bit-line sharing scheme. For example, the bit line group in the bit cell 610 shown in FIG. 6A may include bit lines BL[0] and BL[1] which are shunted via the conductive element 611 (e.g., a metal wire) between nodes N60 and N61, and the programmable elements 60 and 61 associated with the bit lines BL[0] and BL[1] in the bit cell 610 may have respective programming devices such as transistors Q60 and Q61. The programmable element 60 may have a first terminal electrically connected to node N60, and a second terminal electrically connected to node N1. The programmable element 61 may have a first terminal electrically connected to node N61, and a second terminal electrically connected to node N2.

Thus, the equivalent resistance $R_{drop}$ of the bit line group (i.e., including the bit lines BL[0] and BL[1]) on the programming path can be reduced significantly. Given that $R_{drop1}$ and $R_{drop2}$ respectively denotes the resistances of the bit lines BL[0] and BL[1], the equivalent resistance $R_{drop}$ of the bit line group can be expressed by formula (1) as described above.

When the programmable element 60 or 61 on the bit line BL[0] or BL[1] in the bit cell 610 is to be programmed, the word lines WL0[0] or WL0[1] will be asserted to activate the programming device (e.g., transistors Q60 or Q61) associated with the programmable element 60 or 61 to be programmed, and a voltage pulse will be applied to both the bit lines BL[0] and BL[1] in the bit cell 610 so as to increase the programming current of the programmable element 61.

Figure 6B:
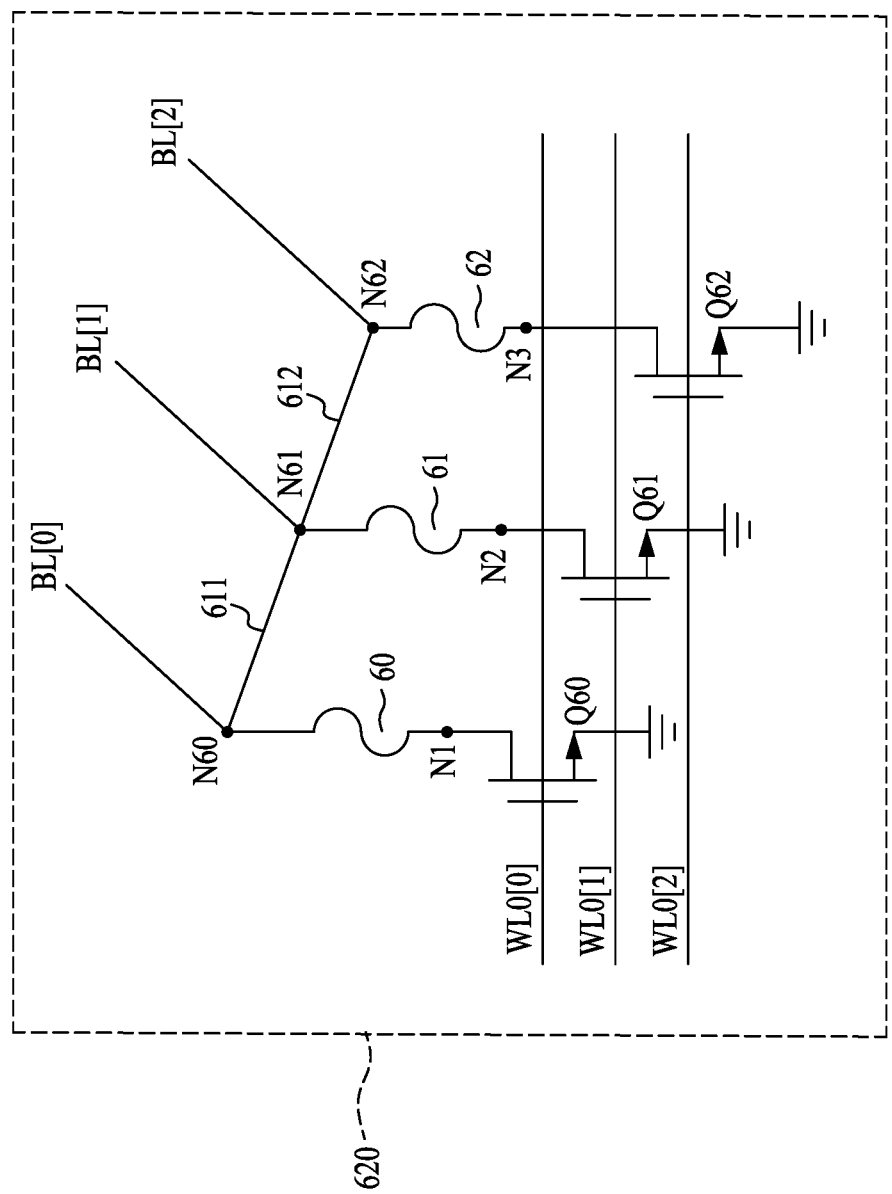
FIG. 6B is a schematic diagram of a bit cell using a 1-to-3 bit-line sharing scheme in accordance with another embodiment of the present disclosure.

FIG. 6B is a schematic diagram of a bit cell using a 1-to-3 bit-line sharing scheme in accordance with another embodiment of the present disclosure.

In some embodiments, the bit cells 620 shown in FIG. 6B may use a 1-to-3 bit-line sharing scheme. For example, the bit cell 620 shown in FIG. 6B may include bit lines BL[0], BL[1], and BL[2] which are shunted, and the programmable elements 60, 61, and 62 associated with the bit lines BL[0], BL[1], and BL[2] in the bit cell 620 may have respective programming devices such as transistors Q60, Q61, and Q62. For example, given that $R_{drop1}$, $R_{drop2}$, and $R_{drop3}$ respectively denotes the resistances of the bit lines BL[0], BL[1], and BL[2], the equivalent resistance $R_{drop}$ of the bit line group can be expressed by formula (2) as follows.

$$R_{drop} \approx R_{drop1} // R_{drop2} // R_{drop3} \quad (2)$$

Thus, the equivalent resistance of the bit line group (i.e., including the bit lines BL[0], BL[1], and BL[2]) on the programming path can be reduced significantly.

When the programmable element 60, 61, or 62 on the bit line BL[0], BL[1], or BL[2] in the bit cell 620 is to be programmed, the word line WL0[0], WL0[1], or WL0[2] will be asserted to activate the programming device associated with the programmable element 60, 61, or 62 to be programmed, and a voltage pulse will be applied to the bit lines BL[0], BL[1], and BL[2] in the bit cell 620 so as to increase the programming current of the programmable element 60, 61, or 62 to be programmed.

Figure 6C:
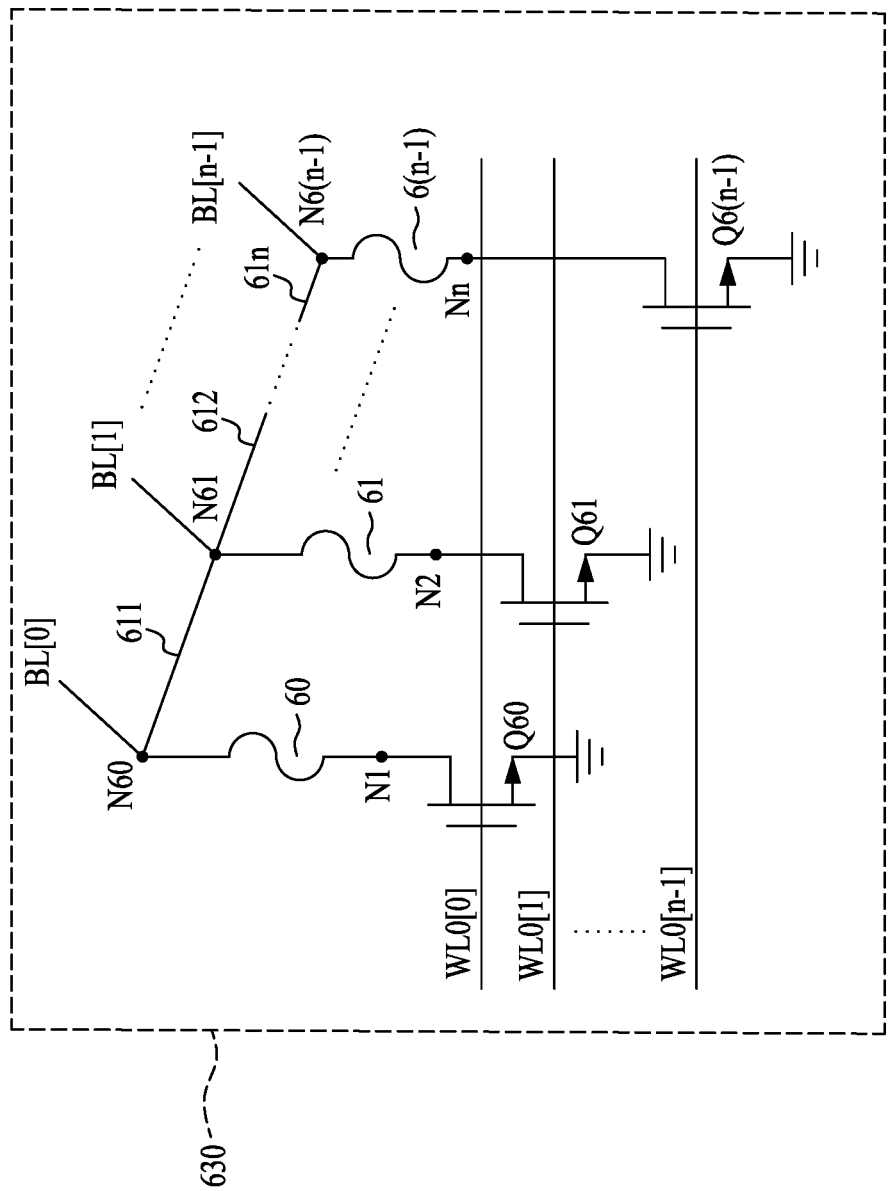
FIG. 6C is a schematic diagram of a bit cell using a 1-to-N bit-line sharing scheme in accordance with yet another embodiment of the present disclosure.

FIG. 6C is a schematic diagram of a bit cell using a 1-to-N bit-line sharing scheme in accordance with yet another embodiment of the present disclosure.

In some embodiments, the bit cells 630 shown in FIG. 6C may use a 1-to-n bit-line sharing scheme, the number n may be a positive integer greater than 1. For example, the bit cell 630 shown in FIG. 6C may include bit lines BL[0], to BL[n−1] which are shunted, and the programmable elements 60 to 6(n−1) associated with the bit lines BL[0] to BL[n−1] in the bit cell 630 may have respective programming devices such as transistors Q60 to Q6(n−1).

For example, given that $R_{drop1}$ to Rdropn respectively denotes the resistances of the bit lines BL[0] to BL[n−1], the equivalent resistance $R_{drop}$ of the bit line group can be expressed by formula (3) as follows.

$$R_{drop} \approx R_{drop1} // R_{drop2} // \ldots // R_{dropn} \quad (3)$$

Thus, the equivalent resistance of the bit line group (i.e., including the bit lines BL[0] to BL[n−1]) on the programming path can be reduced significantly.

When the programmable element 60 to 6(n−1) on one of the bit lines BL[0] to BL[n−1] in the bit cell 630 is to be programmed, one of the word lines WL0[0] to WL0[n−1] will be asserted to activate the programming device associated with the programmable element 61 to be programmed, and a voltage pulse will be applied to the bit lines BL[0] to BL[n−1] in the bit cell 630 so as to increase the programming current of the programmable element 61.

Figure 7A:
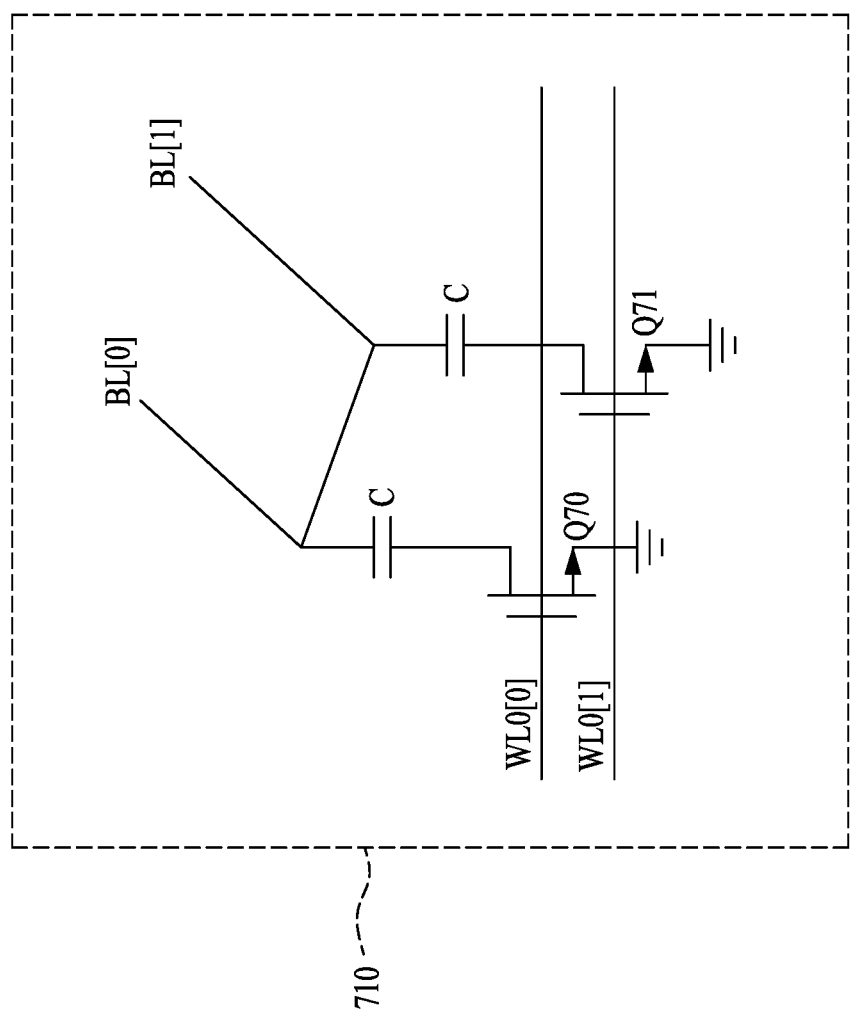
FIG. 7A is a schematic diagram of a bit cell using a 1-to-2 bit-line sharing scheme with capacitive non-volatile memory cells in accordance with an embodiment of the present disclosure.

FIG. 7A is a schematic diagram of a bit cell using a 1-to-2 bit-line sharing scheme with capacitive non-volatile memory cells in accordance with an embodiment of the present disclosure.

In some embodiments, the bit cell 710 in FIG. 7A may use a 1-to-2 bit-line sharing scheme with capacitive non-volatile memory cells C (e.g., non-volatile memory cells with capacitors). For example, the bit line group in the bit cell 710 may include bit lines BL[0] and BL[1] which are shunted. In comparison with FIG. 6A, the programmable elements associated with the bit lines BL[0] and BL[1] in the bit cell 710 may be capacitive non-volatile memory cells C that have respective programming devices such as transistors Q70 and Q71. Since each capacitive non-volatile memory cell C in bit cell 710 correspond to one transistor, the circuit in the bit cell 710 may be referred to as a 1T1C structure.

In some embodiments, the programmable elements associated with the bit lines BL[0] and BL[1] in the bit cell 710 may be resistive non-volatile memory cells R (e.g., non-volatile memory cells with resistors). In this regard, the circuit in the bit cell 710 may be referred to as a 1T1R structure.

Figure 7B:
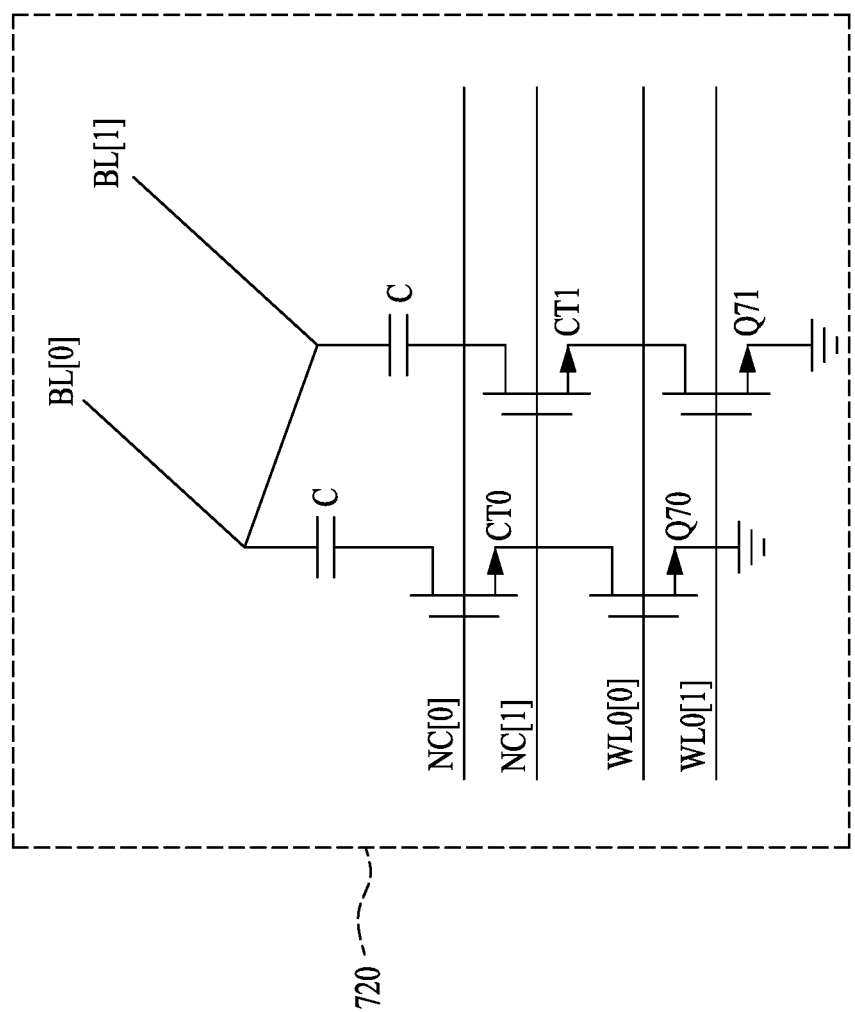
FIG. 7B is a schematic diagram of a bit cell using a 1-to-2 bit-line sharing scheme with capacitive non-volatile memory cells in accordance with another embodiment of the present disclosure.

FIG. 7B is a schematic diagram of a bit cell using a 1-to-2 bit-line sharing scheme with capacitive non-volatile memory cells in accordance with another embodiment of the present disclosure.

In some embodiments, the bit cell 720 in FIG. 7B may use a 1-to-2 bit-line sharing scheme with capacitors. In comparison with FIG. 7A, the programmable elements associated with the bit lines BL[0] and BL[1] in the bit cell 720 may be capacitive non-volatile memory cells C (e.g., non-volatile memory cells with capacitors) that have respective programming devices (e.g., transistors Q70 and Q71) and control devices (e.g., transistors CT0 and CT1). The control signals NC[0] and NC[1] for the control devices (e.g., transistors CT0 and CT1) may be generated by an external control circuit. Since each capacitive non-volatile memory cell C in the bit cell 720 corresponds to two transistors (e.g., transistors Q70 and CT0, or transistors Q71 and CT1), the circuit in the bit cell 720 may be referred to as a 2T1C structure.

In some embodiments, the programmable elements associated with the bit lines BL[0] and BL[1] in the bit cell 720 may be resistive non-volatile memory cells R (e.g., non-volatile memory cells with resistors). In this regard, the circuit in the bit cell 720 may be referred to as a 2T1R structure.

Figure 7C:
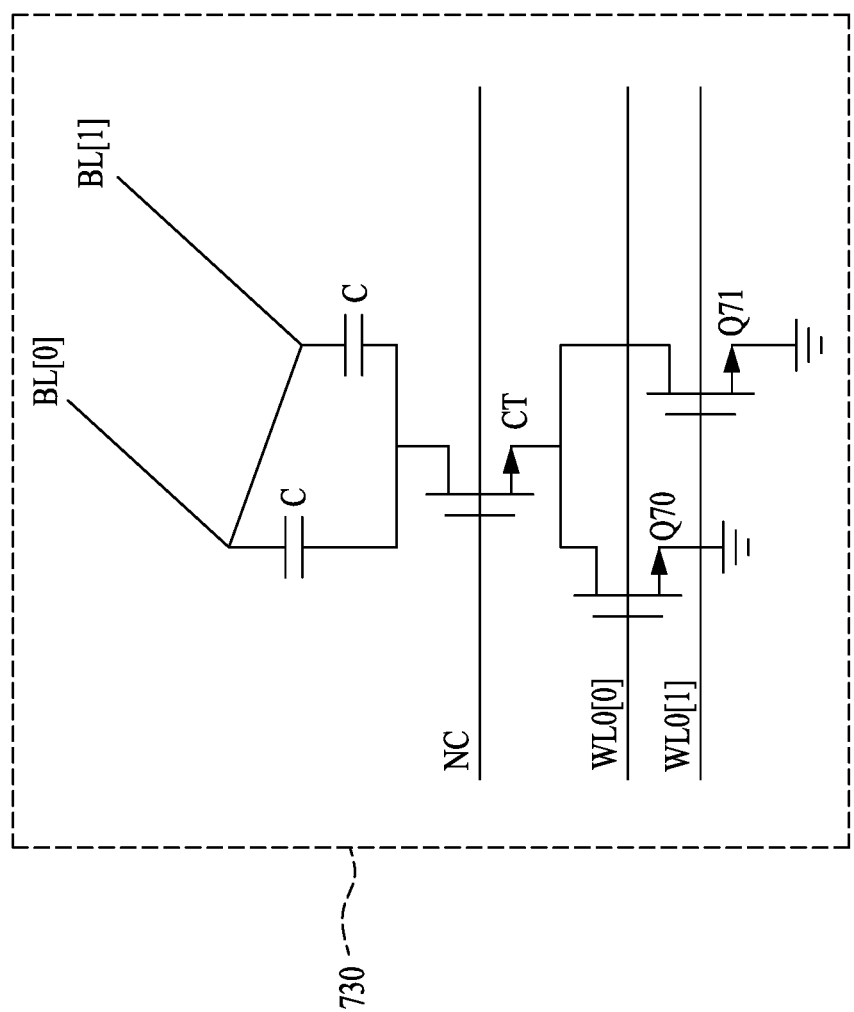
FIG. 7C is a schematic diagram of a bit cell using a 1-to-2 bit-line sharing scheme with capacitive non-volatile memory cells in accordance with yet another embodiment of the present disclosure.

FIG. 7C is a schematic diagram of a bit cell using a 1-to-2 bit-line sharing scheme with capacitive non-volatile memory cells in accordance with yet another embodiment of the present disclosure.

In some embodiments, the bit cell 730 in FIG. 7C may use a 1-to-2 bit-line sharing scheme with capacitive non-volatile memory cells. In comparison with FIG. 7A, the programmable elements associated with the bit lines BL[0] and BL[1] in the bit cell 730 may be capacitive non-volatile memory cells C (e.g., non-volatile memory cells with capacitors) that have respective programming devices (e.g., transistors Q70 and Q71) and one shared control device (e.g., transistors CT). The control signal NC for the control device (e.g., transistors CT) may be generated by an external control circuit. Since each capacitive non-volatile memory cell C in the bit cell 730 corresponds to one programming transistor (e.g., transistors Q70 or Q71) and one shared transistor (e.g., transistor CT), the circuit in the bit cell 730 may be referred to as a 1.5T1C structure.

In some embodiments, the programmable elements associated with the bit lines BL[0] and BL[1] in the bit cell 730 may be resistive non-volatile memory cells R (e.g., non-volatile memory cells with resistors). In this regard, the circuit in the bit cell 730 may be referred to as a 1.5T1R structure.

Figure 7D:
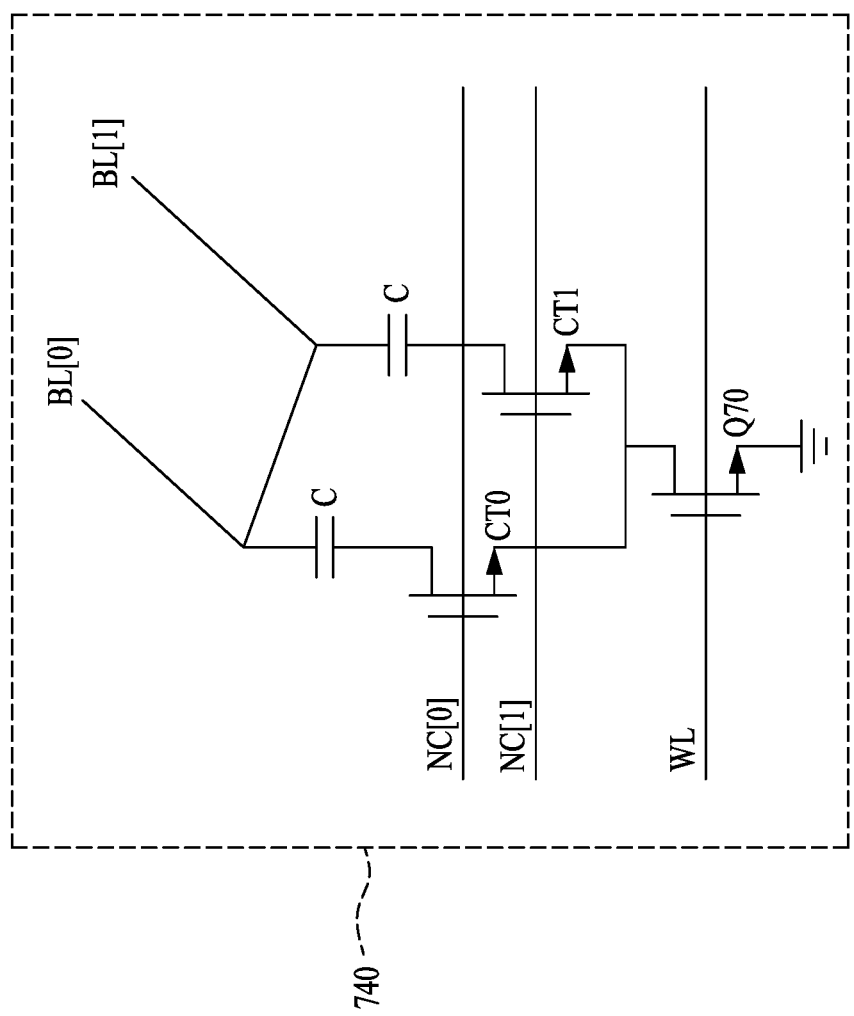
FIG. 7D is a schematic diagram of a bit cell using a 1-to-2 bit-line sharing scheme with capacitive non-volatile memory cells in accordance with yet another embodiment of the present disclosure.

FIG. 7D is a schematic diagram of a bit cell using a 1-to-2 bit-line sharing scheme with capacitive non-volatile memory cells in accordance with yet another embodiment of the present disclosure.

In some embodiments, the bit cell 740 in FIG. 7D may use a 1-to-2 bit-line sharing scheme with capacitive non-volatile memory cells. In comparison with FIG. 7A, the programmable elements associated with the bit lines BL[0] and BL[1] in the bit cell 740 may be capacitive non-volatile memory cells C (e.g., non-volatile memory cells with capacitors) that have respective control devices (e.g., transistors CT0 and CT1) and one shared programming device (e.g., transistors Q70). The control signals NC[0] and NC[1] for the control devices (e.g., transistors CT0 and CT1) may be generated by an external control circuit. Since each capacitive non-volatile memory cell C in the bit cell 740 corresponds to one control transistor (e.g., transistors CT0 or CT1) and one shared programming transistor (e.g., transistor Q70), the circuit in the bit cell 740 may also be referred to as a 1.5T1C structure.

In some embodiments, the programmable elements associated with the bit lines BL[0] and BL[1] in the bit cell 730 may be resistive non-volatile memory cells R (e.g., non-volatile memory cells with resistors). In this regard, the circuit in the bit cell 740 may be referred to as a 1.5T1R structure.

In an embodiment, the present disclosure provides a semiconductor device. The semiconductor device includes a plurality of programmable elements and a plurality of programming devices. The programmable elements are arranged in a two dimensional array having a plurality of word line groups and a plurality of bit lines. Each of the programming devices is electrically connected to a respective programmable element among the programmable elements. The bit lines comprises a plurality of bit-line groups, and each bit-line group comprises N bit lines that are shunted, where N is a positive integer greater than 1.

In another embodiment, the present disclosure provides a semiconductor device. The semiconductor device includes a plurality of bit cells arranged in a two dimensional array. Each of the bit cells comprises: a first programmable element, a second programmable element, a first programming device, and a second programming device. The first programmable element is disposed on a first bit line. The second programmable element is disposed on a second bit line adjacent to the first bit line. The first programming device is coupled between the first programmable element and a ground. The second programming device is coupled between the second programmable element and the ground. The first bit line and the second bit line are shunted.

In yet another embodiment, the present disclosure provides a programmable macro circuit. The programmable macro circuit includes: a first programmable element a second programmable element, a first programming device, and a second programming device. The first programmable element has a first terminal electrically connected to a first bit line, and a second terminal electrically connected to a first node. The second programmable element has a first terminal electrically connected to a second bit line, and a second terminal electrically connected to a second node. The first programming device is coupled between the first node and a ground. The second programming device is coupled between the second node and the ground. A first input terminal of the first bit line and a second input terminal of the second bit line are electrically connected via a first conductive element. The first terminal of the first programmable element and the first terminal of the second programmable element are electrically connected via a second conductive element.

The methods and features of the present disclosure have been sufficiently described in the provided examples and descriptions. It should be understood that any modifications or changes without departing from the spirit of the present disclosure are intended to be covered in the protection scope of the present disclosure.

Moreover, the scope of the present application is not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, can be utilized according to the present disclosure.

Accordingly, the appended claims are intended to include within their scope processes, machines, manufacture, compositions of matter, means, methods or steps. In addition, each claim constitutes a separate embodiment, and the combination of various claims and embodiments are within the scope of the present disclosure.

What is claimed is:

1. A semiconductor device, comprising:
a plurality of programmable elements, arranged in a two dimensional array having a plurality of word line groups and a plurality of bit lines; and
a plurality of programming devices, each of the programming devices is electrically connected to a respective programmable element among the programmable elements;
wherein the bit lines comprise a plurality of bit-line groups, and each bit-line group comprises N bit lines that are shunted, where N is a positive integer greater than 1.

2. The semiconductor device of claim 1, wherein each of the word line groups comprises N word lines that are configured to control the programming device with respect to the programmable element on each bit line in each bit-line group.

3. The semiconductor device of claim 2, wherein when a specific programmable element among the programmable elements is to be programmed, one of the word line group associated with specific programmable element is asserted to activate the programming device corresponding to the specific programmable element, and a voltage pulse is applied to the bit lines in the bit line group with respect to the specific programmable element.

4. The semiconductor device of claim 3, wherein an equivalent resistance of the bit line group with respect to the specific programmable element is substantially equal to a shunt resistance of resistances of the bit lines in the bit line group with respect to the specific programmable element.

5. The semiconductor device of claim 3, wherein a programming current flowing through the specific programmable element is a total current of respective currents flowing through the bit lines in the bit line group with respect to the specific programmable element.

6. The semiconductor device of claim 1, wherein the programmable elements are electrical fuses (eFuses), metal fuses, poly fuses, or anti-fuses.

7. The semiconductor device of claim 1, wherein the programmable elements are one-time-programmable non-volatile memory cells.

8. The semiconductor device of claim 7, wherein the one-time-programmable non-volatile memory cells comprise resistive random access memory (RRAM) cells, magnetoresistive random access memory (MRAM) cells, phase-change random access memory (PCRAM) cells, and ultraviolet-erasable programmable read-only memory (UV-EPROM).

9. The semiconductor device of claim 2, wherein a control transistor is disposed between the programmable element and the programming device on each bit line of each bit-line group.

10. The semiconductor device of claim 1, wherein the programmable elements on two adjacent bit lines in each bit line group are electrically connected to the respective programming devices through a control transistor.

11. The semiconductor device of claim 1, wherein each of the word line groups comprises a word line configured to control the programming device with respect to the programmable elements on two adjacent bit lines in each bit line group.

12. The semiconductor device of claim 11, wherein the programmable elements on the two adjacent bit lines in each bit line group are electrically connected to the programming device through respective control transistors.

13. A semiconductor device, comprising:
a plurality of bit cells, arranged in a two dimensional array, wherein each of the bit cells comprises:
a first programmable element, disposed on a first bit line;
a second programmable element, disposed on a second bit line adjacent to the first bit line;
a first programming device, coupled between the first programmable element and a ground; and
a second programming device, coupled between the second programmable element and the ground,
wherein the first bit line and the second bit line are shunted.

14. The semiconductor device of claim 13, wherein the first programming device is controlled by a first word line of a word line group, and the second programming device is controlled by a second word line of the word line group.

15. The semiconductor device of claim 13, wherein the first programmable element and the second programmable element comprise capacitive non-volatile memory cells or resistive non-volatile memory cells.

16. The semiconductor device of claim 13, wherein the first programmable element and the second programmable element comprise electrical fuses, metal fuses, poly fuses, or anti-fuses.

17. A programmable macro circuit, comprising:
a first programmable element, having a first terminal electrically connected to a first bit line, and a second terminal electrically connected to a first node;
a second programmable element, having a first terminal electrically connected to a second bit line, and a second terminal electrically connected to a second node;
a first programming device, coupled between the first node and a ground; and
a second programming device, coupled between the second node and the ground,
wherein the first terminal of the first programmable element and the first terminal of the second programmable element are electrically connected via a conductive element.

18. The programmable macro circuit of claim 17, wherein the first programming device is controlled by a first bit of a word line, and the second programming device is controlled by a second bit of the word line.

19. The programmable macro circuit of claim 18, wherein the first bit of the word line is asserted to activate the first programming device when the first programmable element is to be programmed, and the second bit of the word line is asserted to activate the second programming device when the second programmable element is to be programmed.

20. The programmable macro circuit of claim 19, wherein when the first programmable element or the second programmable element is to be programmed, a voltage pulse is applied to the first bit line and the second bit line.

* * * * *